US011307921B2

(12) United States Patent
Noe et al.

(10) Patent No.: US 11,307,921 B2
(45) Date of Patent: Apr. 19, 2022

(54) COORDINATED PANIC FLOW

(71) Applicant: Apple Inc., Cupertino, CA (US)

(72) Inventors: Christopher J. Noe, San Francisco, CA (US); Joshua H. Berlin, San Francisco, CA (US); Joseph J. Castro, San Jose, CA (US); Hardik K. Doshi, Los Altos, CA (US); Joel N. Kerr, San Jose, CA (US); Kerry J. Kopp, Los Altos Hills, CA (US); Michael J. Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/114,388

(22) Filed: Dec. 7, 2020

(65) Prior Publication Data

US 2021/0117265 A1     Apr. 22, 2021

Related U.S. Application Data

(63) Continuation of application No. 16/147,330, filed on Sep. 28, 2018, now Pat. No. 10,860,412.

(60) Provisional application No. 62/596,370, filed on Dec. 8, 2017.

(51) Int. Cl.
*G06F 11/07*     (2006.01)
*G06F 11/30*     (2006.01)

(52) U.S. Cl.
CPC ...... *G06F 11/0778* (2013.01); *G06F 11/0706* (2013.01); *G06F 11/0772* (2013.01); *G06F 11/0787* (2013.01); *G06F 11/3072* (2013.01)

(58) Field of Classification Search
CPC ............. G06F 11/0778; G06F 11/0706; G06F 11/0772; G06F 11/0787; G06F 11/3072
See application file for complete search history.

(56) References Cited

U.S. PATENT DOCUMENTS

| | | | |
|---|---|---|---|
| 6,622,260 B1 * | 9/2003 | Marisetty | G06F 11/0724 714/10 |
| 7,984,328 B1 | 7/2011 | Coatney | |
| 8,151,147 B2 | 4/2012 | Rajkumari et al. | |
| 9,495,233 B2 | 11/2016 | McNairy et al. | |
| 9,529,661 B1 | 12/2016 | Miller et al. | |
| 9,703,622 B2 | 7/2017 | Mayer et al. | |
| 9,772,894 B2 | 9/2017 | Parnell et al. | |
| 10,860,412 B2 | 12/2020 | Noe et al. | |

(Continued)

*Primary Examiner* — Matthew M Kim
*Assistant Examiner* — Kurosu Risa Altaf
(74) *Attorney, Agent, or Firm* — Baker & Hostetler LLP

(57) ABSTRACT

One embodiment provides for a data processing system comprising multiple independent processors to execute multiple operating system environments of the data processing system, the multiple operating system environments to enable operation of multiple regions of a computing device associated with the data processing system. The multiple operating system environments are interconnected via a transport agnostic communication link. In response to detection of a fatal error in one or more of the multiple operating system environments, the multiple operating system environments coordinate performance of multiple separate error handling operations within the multiple operating system environments to generate a combined error log. The combined error log includes operational states of the multiple operating system environments.

20 Claims, 9 Drawing Sheets

(56) References Cited

U.S. PATENT DOCUMENTS

| | | | |
|---|---|---|---|
| 2008/0010506 A1* | 1/2008 | Tabei | G06F 11/0784 |
| | | | 714/6.12 |
| 2010/0211824 A1* | 8/2010 | Agrawal | G06F 11/0706 |
| | | | 714/23 |
| 2011/0154091 A1 | 6/2011 | Walton et al. | |
| 2011/0154128 A1* | 6/2011 | Rajkumari | G06F 11/0709 |
| | | | 714/48 |
| 2015/0006962 A1* | 1/2015 | Swanson | G06F 11/0724 |
| | | | 714/38.11 |
| 2015/0033071 A1 | 1/2015 | Shacham et al. | |
| 2015/0362980 A1 | 12/2015 | Tripathi | |
| 2016/0188394 A1* | 6/2016 | Schumacher | G06F 11/0712 |
| | | | 714/49 |
| 2016/0224442 A1 | 8/2016 | Sanghi et al. | |
| 2018/0060231 A1 | 3/2018 | Kelly et al. | |
| 2019/0179695 A1 | 6/2019 | Noe et al. | |
| 2019/0324790 A1 | 10/2019 | Li et al. | |

* cited by examiner

COORDINATED PANIC FLOW

CROSS-REFERENCE

This application is a continuation of co-pending U.S. patent application Ser. No. 16/147,330, filed Sep. 28, 2018, now issued as Ser. No. 10,860,412, which claims priority to U.S. Provisional Patent Application No. 62/596,370 filed Dec. 8, 2017, which is hereby incorporated herein by reference.

TECHNICAL FIELD

This disclosure relates generally to the field of data processing systems for computing devices, and more specifically to coordinating panic flow across multiple different types of processors within a computing device.

BACKGROUND OF THE DISCLOSURE

As computing devices have become more complex, overall system architecture has evolved from computing devices in which a single data processing system controls relatively simple input/output (I/O) devices into hybrid computing environments in which independently operating data processing systems coordinate to manage complex I/O operations. The individual I/O peripherals within a computing device can be accessed via a variety of transports mechanisms, some of which may be unified via a coordination system implemented to enable the various processors of the hybrid computing environment to communicate. For example, a hybrid computing system can be implemented in which traffic between computing nodes within a single computing device is funneled through a data link that can abstract the various underlying communications or interconnect protocols that are carried over such link. In some implementations, the various computing nodes within the single computing device can have separate security domains, such that certain I/O peripherals can be protected from malicious access by program logic executing on a single one of the multiple computing nodes within the device. However, hybrid computing environments can create unique and challenging scenarios when attempting to present the hybrid computing environment as a single, cohesive computing device.

SUMMARY OF THE DESCRIPTION

Embodiments described herein provide hardware and software logic to enable diverse computing environments of a hybrid compute system to function as a single computing device. In particular, embodiments enable a coordinated panic flow in which multiple processing environments of a hybrid compute system coordinate system panic and error reporting. Should one of the essential computing systems within the computing device exhibit a fatal error, each of the systems can perform an error recovery process and report error status, allowing the system to cohesively recover from the error and report a unified error status upon recovery.

One embodiment provides for a computing device comprising multiple independent processors to execute multiple operating system environments of the data processing system, the multiple operating system environments to enable operation of multiple regions of a computing device associated with the data processing system. The multiple operating system environments are interconnected via a transport agnostic communication link. In response to detection of a fatal error in one or more of the multiple operating system environments, the multiple operating system environments coordinate performance of multiple separate error handling operations within the multiple operating system environments to generate a combined error log. The combined error log includes operational states of the multiple operating system environments.

In one embodiment, the multiple independent processors include a first processor including a first set of one or more processor cores to execute a first set of instructions and a second processor that is separate from the first processor, where the second processor includes a second set of one or more processor cores to execute a second set of instructions to enable the first set of instructions to access to a set of input/output devices within the computing device. In response to an error associated with the first processor or the second processor, the first processor and the second processor are to independently execute separate instructions to gather and store respective operational states associated with each processor.

One embodiment provides a data processing system comprising a first processor to execute a first operating system. The first processor includes one or more application processor cores. The electronic device also can include a second processor to execute a second operating system. The second processor includes one or more processor cores to manage a set of input/output devices within the computing device. In one embodiment, in response to detection of an error state within the first operating system, the first operating system can enter an error handler of the first operating system and cause the second operating system to enter the error handler of the second operating system. The error handlers of the first operating system and the second operating system can collect data associated with a state of the operating systems and associated processors of the computing device. At least one of the first operating system or the second operating system can write the data associated with the state of the operating systems and associated processors to a memory device.

One embodiment provides for an error handling method for an electronic device, the method comprising detecting a panic or stop condition within a first operating system on a first processor of the electronic device and signaling a second operating system on a second processor to initiate an error handler. The second processor is separate from the first processor. The method additionally includes initiating an error handler on the second operating system in response to the signal from the first operating system, collecting, via an error handler on the first operating system, data associated with a state of the first processor, collecting, via an error handler on the second operating system, data associated with the state of the second processor, and storing a combined set of data to a memory device coupled with the first processor or the second processor.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Figure 1:
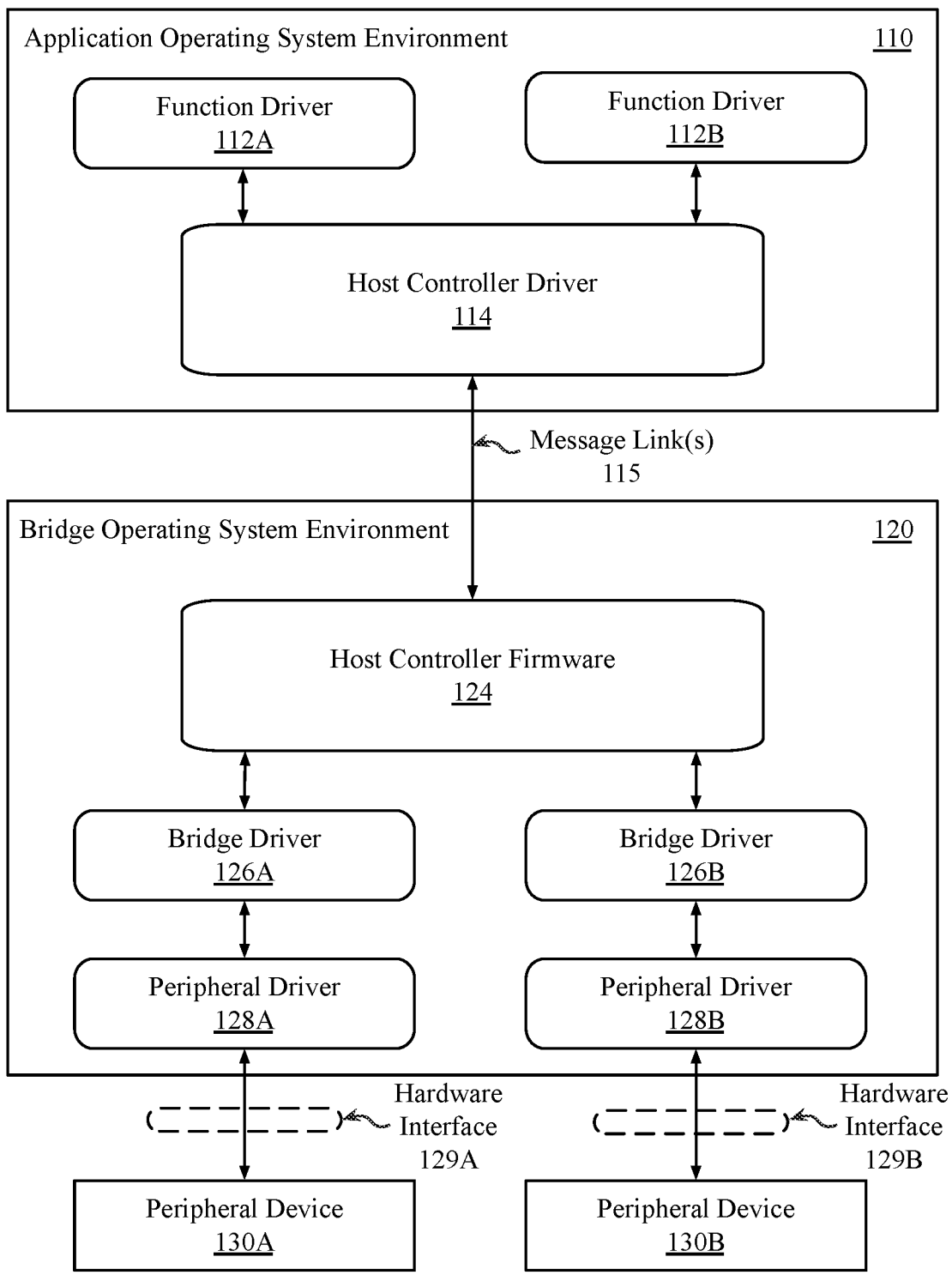
FIG. 1 illustrates operating system environments of a computing device, according to embodiments described herein.

Embodiments described herein provide for a system, method, and apparatus in which multiple distinct computing environments of a hybrid computing device implement a coordinated panic system to enable the hybrid computing device to recover from a fatal error within one of the distinct computing environments and provide a coordinated error report upon system recovery.

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

The processes and operations depicted in the figures that follow can be performed via processing logic that includes hardware (e.g. circuitry, dedicated logic, etc.), software (as instructions on a non-transitory machine-readable storage medium), or a combination of both hardware and software. Although some of the processes are described below in terms of sequential operations, it should be appreciated that some of the operations described may be performed in a different order. Moreover, some operations may be performed in parallel rather than sequentially. Additionally, some operations may be indicated as optional and are not performed by all embodiments.

Exemplary Operating System Environments

The processing systems of the computing devices described herein are tightly coupled but operate independently. Accordingly, each processing system can independently panic, with separate panic handlers. To enable a coordinated, device-wide panic and recovery, a panic flow is enabled to allow a panic by one processing system to propagate through to other processing systems. In various embodiments, two or more distinct processing systems can be present within a computing device, with two primary processing systems being used to coordinate system panic and recovery for the various processing systems. In one embodiment, the two processing systems are a user-facing application processing system, including one or more application processors and an application operating system, and a system facing bridge processing system, which includes a bridge processor and a bridge operating system. In one embodiment, the bridge processing system can facilitate access to I/O peripheral devices within the system on behalf of the application operating system, with the application processing system and the bridge processing system communicating over a high bandwidth message link.

FIG. 1 illustrates operating system environments of a data processing and I/O system 100, according to embodiments described herein. I/O (input/output) operations within the data processing and I/O system 100 are performed by coordinating operations of multiple distinct but coupled operating system environments. In one embodiment, the operating system environments include an application operating system environment 110 and a bridge operating system environment 120. The application operating system environment 110 includes a set of function drivers 112A-112B in communication with a host controller driver 114. The bridge operating system environment 120 includes host controller firmware 124, a set of bridge drivers 126A-126B, and a set of peripheral drivers 128A-128B. In one embodiment, one or more message link(s) 115 can be used to enable communication between the bridge operating system environment 120 and the application operating system environment 110. The message link(s) 115 allow non-memory mapped transport mechanisms to be used and enables a transport-agnostic communication link between the bridge operating system environment 120 and the application operating system environment 110. Any type or number of high-speed, high-bandwidth communication or interconnect transports can be used as the underlying protocols for the message link(s) 115, including PCIe (Peripheral Component Interconnect Express), Ethernet, or other interconnect protocols. In one embodiment, one or more lower-bandwidth interconnect protocols can also be used, such as the enhanced serial peripheral interface (eSPI).

In one embodiment, the components of the application operating system environment 110 are software modules that execute on one or more processors (e.g., application processors) of the data processing and I/O system 100. The host controller driver 114 can be a kernel level driver or a user level driver of the application operating system environment 110 and can enable the application operating system to communicate with a host controller, via the host controller firmware 124, and enable the peripheral devices 130A-130B to interact with the application operating system and associated applications. The function drivers 112A-112B need not be unaware of the implementation details of the host controller, as such details can be abstracted by the host controller firmware 124 and host controller driver 114.

In one embodiment, within the bridge operating system environment 120, the set of peripheral drivers 128A-128B can communicate with a set of peripheral devices 130A-130B via a set of hardware interfaces 129A-129B. The bridge drivers 126A-126B enable interface translation between the peripheral drivers 128A-128B and the host controller firmware 124. A bridge driver for each peripheral can enable communication between any type of peripheral and the host controller firmware 124. Peripheral device 130A and peripheral device 130B can be different types of devices (e.g., keyboard and touchpad, camera and fan controller, etc.) and can communicate via different communication protocols (e.g., serial peripheral interface (SPI), general-purpose input/output (GPIO), Inter-Integrated Circuit (I2C), Universal Asynchronous Receiver/Transmitter (UART), etc.). Thus, hardware interface 129A can differ from hardware interface 129B in physical form factor and communication protocol.

The application operating system environment 110 and the bridge operating system environment 120 are each fully capable systems that are capable of independent operation, with the underlying hardware of each environment having distinct memory, processing, and storage components. Although distinct, the operating environments are tightly coupled and work in concert to enable complete computing device functionality for the data processing and I/O system 100. Accordingly, should a fatal error occur that necessitates a stop-error, panic, or restart of any one operating environment, the other operating environment should respond accordingly using techniques described in further detail below.

Figure 2:
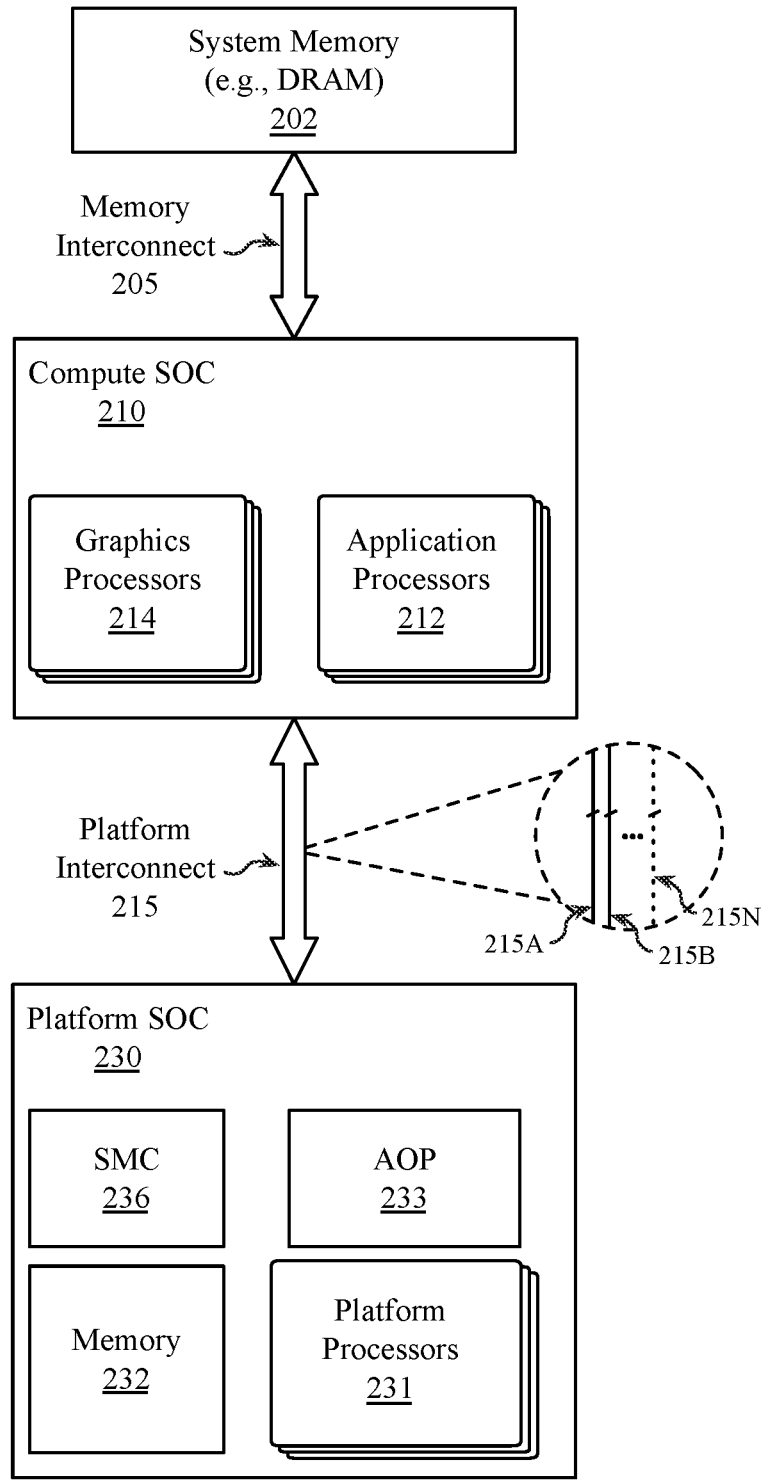
FIG. 2 illustrates a data processing system having multiple hardware processing systems, according to an embodiment.

FIG. 2 illustrates a data processing system 200 having multiple hardware processing systems, according to an embodiment. The data processing system 200 illustrates hardware processing, memory, and interconnect components that can be used, in one embodiment, to implement the data processing and I/O system 100 of FIG. 1. In one embodiment, the data processing system 200 includes a system on a chip integrated circuit (compute SOC 210) including a set of application processors 212, and a set of graphics processors 214. The data processing system 200 also includes a platform SOC 230 having a set of platform processors 231, memory 232, an always-on processor (AOP 233), and a system management controller (SMC 236). While the AOP 233 and SMC 236 are illustrated as a component of the platform SOC 230, in some embodiments the AOP 233 and SMC 236 can be located externally to the platform SOC 230 and/or within the compute SOC 210. In one embodiment, the compute SOC 210 and the platform SOC 230 are coupled via a platform interconnect 215, which can include one or more physical links that can be used to carry the message link(s) 115 of FIG. 1. The platform interconnect 215, in one embodiment, includes multiple physical links 215A-215N, including one or more high-speed, high-bandwidth links (e.g., PCIe) and one or more relatively lower speed interconnects (e.g., eSPI). In one embodiment, different links within the platform interconnect 215 can be associated with specific processors or components within the compute SOC 210 and platform SOC 230. For example, one or more application processors 212 can communicate with the SMC 236 via an eSPI bus, while the application processors 212 can communicate with the platform processors 231 via PCIe.

The compute SOC 210 can couple with system memory 202 via a memory interconnect 205. In various embodiments, the system memory 202 can include one or more of various types of memory, including, but not limited to, dynamic random-access memory (DRAM). The graphics processors 214 can perform computations and rendering for three-dimensional graphics and provide images for a graphical user interface. The graphics processors 214 can also act as a co-processor for the application processors 212. For example, the graphics processors 214 can perform general-purpose compute operations (e.g., via compute shader programs, etc.) for machine-learning tasks.

The SMC 236, in one embodiment, is a microcontroller or microprocessor configured to perform system management operations, including power management operations. The SMC 236 is not externally programmable and thus is not corruptible by malware or malicious attackers. The SMC 236 can be used to verify boot code for a processor within the system before allowing the processor to boot. The SMC 236 can also be used to relay messages and commands between processors when the system is in a degraded state. The platform SOC 230 also includes memory 232, which can be DRAM memory that can be similar to the system memory 202 used by the compute SOC 210, although the memory 232, in differing embodiments, can also be lower-power or higher-speed memory relative to the system memory 202

The AOP 233 within the platform SOC 230 is an always-on processor that is a lower power processor that can remain powered when the remainder of the data processing system 200 is powered off. The AOP 233 can be configured to power up other components while keeping the application processors 212 powered down, in order to enable the system to perform tasks assigned to the other components. In one embodiment, the AOP 233 can be configured as a co-processor that can perform a limited number of operations for the data processing system 200 before powering up other, higher-power processors. In one embodiment, the AOP 216 can also include separate random-access memory, such as a static random-access memory. In one embodiment, the AOP 233 can also include high-speed non-volatile memory.

In one embodiment, the platform processors 231 include various processing devices that are used to perform system operations and facilitate access to I/O devices for the compute SOC 210. The platform processors 231 can include, but are not limited to a bridge processor that can perform operations for a bridge operating system environment 120 as in FIG. 1, as well as storage processors, audio processors, image processors, video processors, and other processors or co-processors that are used to perform or manage audio, video, and media processing for the system, as well as enable storage functionality and system security services.

In one embodiment, the application processors 212 and the platform processors 231 can each be the same or similar in architecture and microarchitecture. For example, the application processors 212 and platform processors 231 can each be higher-performance or lower power variants of a similar processor, where each processor is configured to execute the same instruction set architecture. In one embodiment, the application processors 212 and the platform processors 231 can differ in architecture and/or microarchitecture, such that program code compiled for execution on the platform SOC 230 may not be directly executable on the compute SOC 210, although translation libraries may enable the exchange and execution of specific binaries or object files. For example, in one embodiment the application processors 212 can be configured to execute instructions compiled for a variant of the Intel instruction set architecture (e.g., x86-64), while the platform processors 231 can be configured to execute a variant of the advanced RISC machines (ARM) instruction set architecture (e.g., ARM-64).

The various processors within the data processing system 200 can each independently crash or encounter operational issues. A fatal error can occur on one of the processing systems for a variety of reasons, including, but not limited to a software error within an operating system kernel or kernel extension, or due to a hardware error caused by a hardware defect, hardware fault, or extreme environmental condition, such as a thermally induced defect. Accordingly, it is desirable to enable a system-wide fault logging and recovery system that enables error logs to be recovered from each of the multiple processing systems. Such system-wide fault logging system can enable the terminal state of each processing system to be determined and collected. When an operating system of one of the distinct processing systems detects a fatal error, the operating system can inform the other processing systems, or operating systems executing on the other processing systems, that a fatal error has occurred and the coordinated panic flow is to be enabled across all processing systems.

As described herein, a "panic" refers to an internal function of a processing system that stops the ordinary flow of control in response to detection of a condition in which the processing system can no longer operate safely without introducing the risk of data loss or corruption. A panic generally refers to a stop error in Unix and Unix-like systems, such as, but not limited to the Macintosh operating system (e.g., macOS, OS X) by Apple Inc. of Cupertino Calif. As used herein, panic also refers to a "stop error" or any operating system or processing system halt in response to a fatal error or unsafe operating condition. For example, a machine check exception error or another type of hardware error can be raised by a processor within the system, which can cause a panic, stop error, or another fatal error within an operating system associated with that processor. Additionally, where the term "error" is used herein, such reference generally refers to a fatal error or another error condition in which a processor or operating system restart is required to re-enable normal system operation.

Figure 3A:
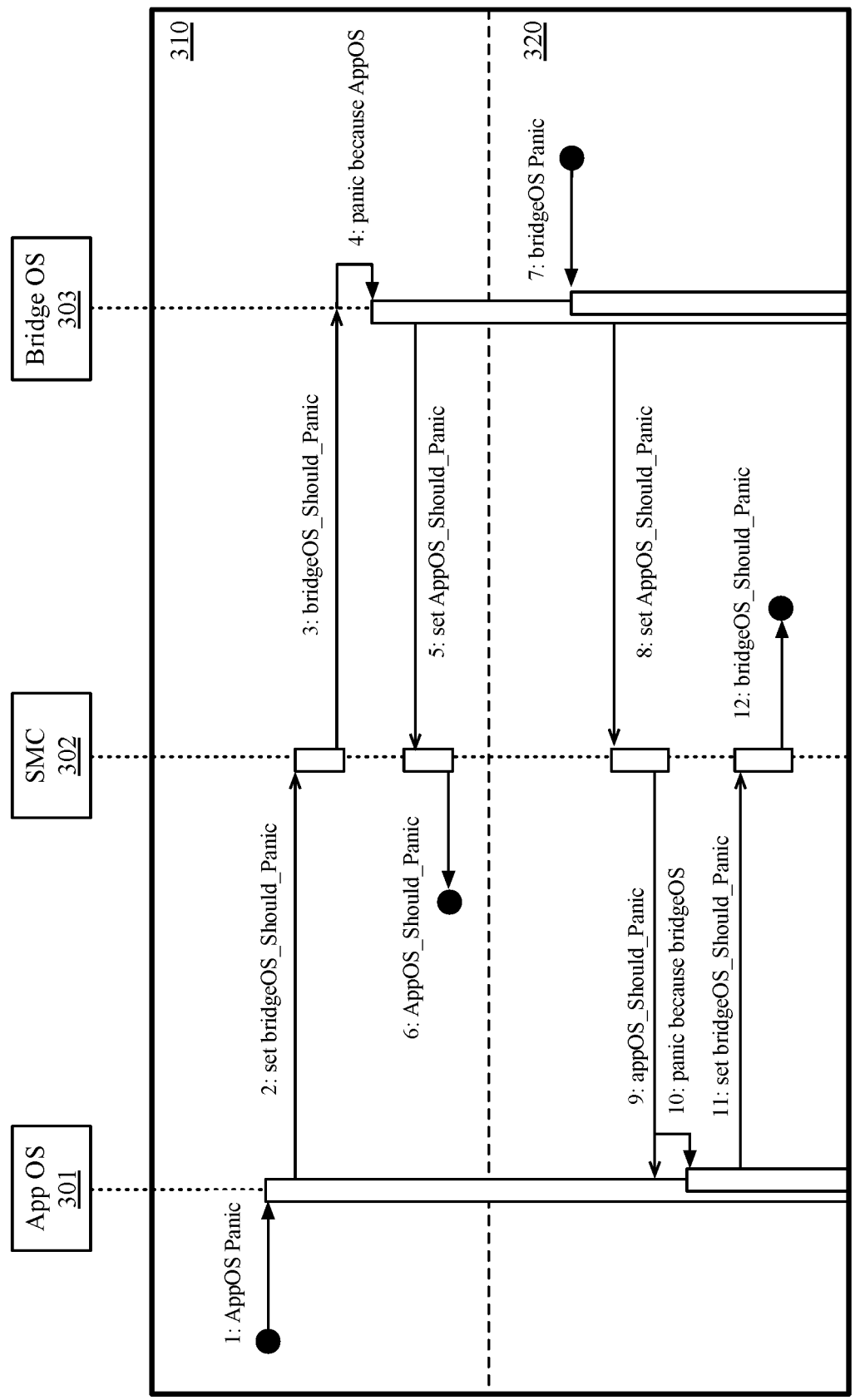
FIG. 3A-3B illustrates panic flows across processing systems of a computing device, according to embodiments described herein.
Figure 3B:
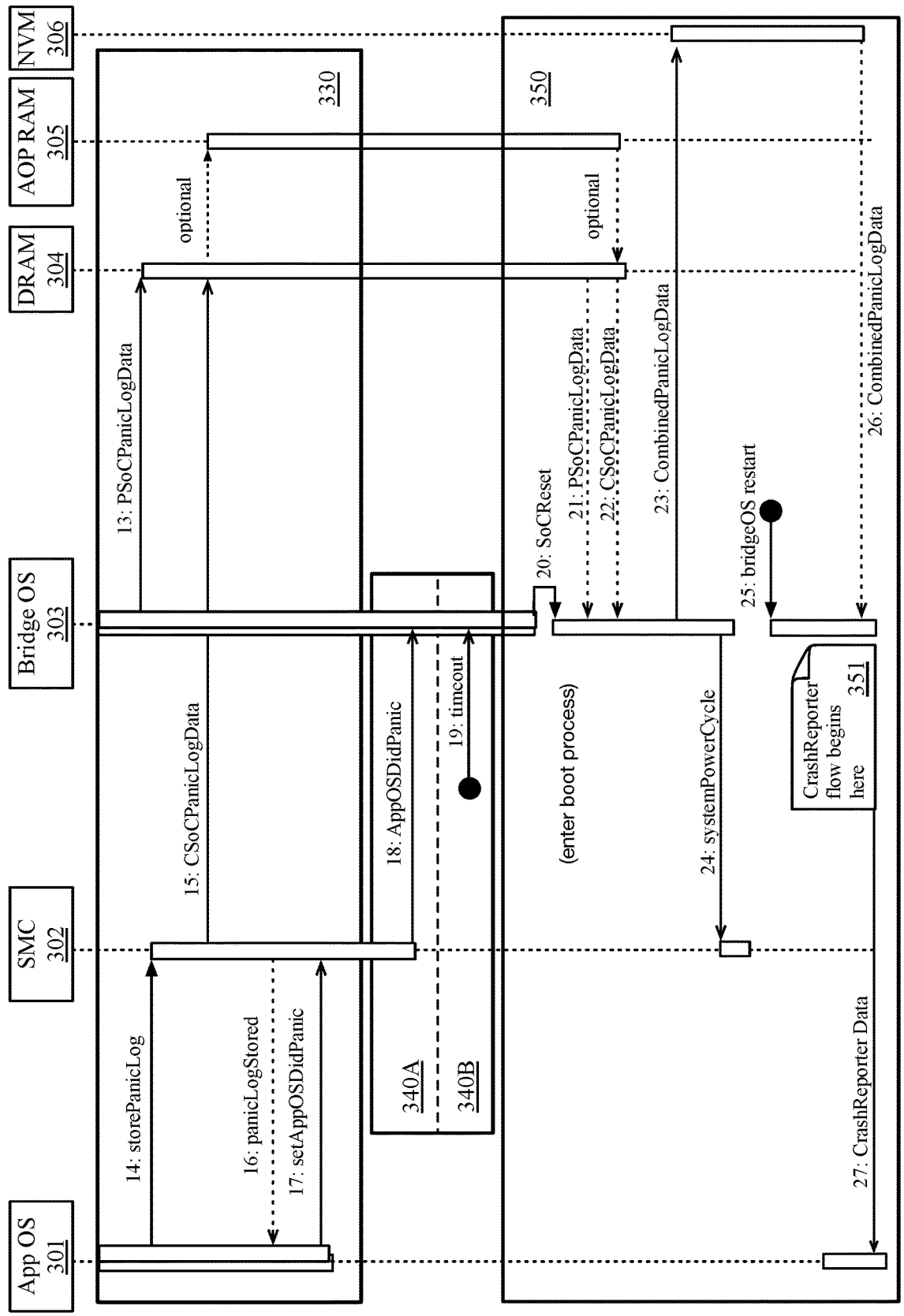

FIG. 3A-3B illustrates panic flows across processing systems of a computing device, according to embodiments described herein. FIG. 3A illustrates alternate flows for a panic initiation 310, 320 in which the application operating system (App OS 301) or the bridge operations system (bridge OS 303) initiate a system panic flow. FIG. 3B illustrates operational flows 330, 340, 350 to store and retrieve panic logs and other debug data. As described herein, the App OS 301 represents a user or application-facing operating environment, such as the application operating system environment 110 of FIG. 1, while the bridge OS 303 represents a platform-facing operating environment, such as the bridge operating system environment 120 of FIG. 1. In one embodiment, the App OS 301 can also represent a firmware interface, such as the unified extensible firmware interface (UEFI), for the computing device. For example, the computing device firmware interface can react to hardware exceptions raised by a processor within the computing device.

As shown in FIG. 3A, one panic initiation 310 begins when, for one of multiple possible reasons, the App OS 301 enters a panic handler. (1: AppOS Panic). During execution of the App OS panic handler, the panic handler can coordinate panic operations with the bridge OS 303. In one embodiment, the App OS 301 can coordinate panic handling by signaling the bridge OS 303 via the system management controller (SMC 302), or a similar system micro controller or system management processor. The App OS 301 can access the SMC 302 via a series of API keys, which can access or trigger specific functionality on the SMC 302. The App OS 301 can set a key that causes the SMC 302 to signal the Bridge OS 303 to enter the panic handler (2: set bridgeOS_Should_Panic). In response, the SMC 302 can send a signal the Bridge OS 303 to enter the panic handler (3: bridgeOS_Should_Panic). The Bridge OS 303, having received the indication from the SMC 302 to panic, can enter the panic handler on the Bridge OS 303, while setting a value that indicates that the panic occurred in response to a panic on the App OS 301 (4: panic because AppOS). The Bridge OS 303 panic handler, as part of the panic process, can signal to the SMC 302 that the App OS 301 should panic (5: set AppOS_Should_Panic). In one embodiment, to ensure a closed loop of interoperability, the Bridge OS 303 can signal the App OS 301 to panic even in instances in which the Bridge OS 303 has entered its panic handler as a result of a panic by the App OS 301. The SMC 302 can then signal the App OS 301 to panic (6: AppOS_Should_Panic). If at this point the App OS 301 has successfully entered its panic handler and has completed the panic process, or is in the process of completing the panic process, the message from the AppOS_Should_Panic message from the SMC 302 may not be received at the App OS 301. However, the (6: AppOS_Should_Panic) message from the SMC 302 can act as a failsafe to provide additional assurance that the App OS 301 has performed panic handling operations.

A panic initiation 320 can also begin when, for one of multiple possible reasons, the Bridge OS 303 enters a panic handler (7: bridgeOS Panic). The bridge OS 303 can send a message to the SMC 302 (8: set AppOS_Should_Panic), which can trigger the App OS 301 to enter its panic handler (9: appOS_Should_Panic). The App OS 301 can enter its panic handler and set a value to indicate that the panic occurred in response to a panic by the Bridge OS 303 (10: panic because bridgeOS). During execution of the panic handler of the App OS 301, the App OS can signal the SMC 302 that the bridge OS 303 should panic (11: set bridgeOS_Should_Panic). The SMC 302 can then relay a signal to the Bridge OS 303 that the bridge OS 303 should panic (12: bridgeOS_Should_Panic). The App OS 301 can signal the Bridge OS 303 to panic even in instances in which the App OS 301 has entered its panic handler as a result of a panic by the Bridge OS 303 to ensure a closed loop of interoperability and as a failsafe to ensure the Bridge OS 303 enters its panic handler when the App OS 301 panics.

FIG. 3B illustrates operational flows 330, 340, 350 to store and retrieve panic logs and other debug data. As illustrated, each processing system can gather panic log data that describes the state of the processing system at the time in which the panic handler executes. The panic log data from each processing system can be collected and coalesced into a unified panic log via operational flow 330 and 350. During execution of the panic handler on the Bridge OS 303, as in in operational flow 330, the panic handler can cause the Bridge OS 303 to collect and store panic log data from the various components of the platform SOC (e.g., Platform SOC 230 of FIG. 2). For example, in addition to panic log data from the Bridge OS 303 and bridge processor, system state from storage processors, security processors, and other components within the platform SOC. The bridge OS 303 can collect this log data and temporarily store the data within DRAM 304 (13: PSoCPanicLogData). The DRAM 304 can be platform SOC DRAM (e.g., memory 232 in FIG. 2) or another memory component accessible to the Bridge OS 303.

The App OS 301 also gathers panic log data, which can include hardware state associated with the application processors (e.g., application processors 212 of FIG. 2) that execute the App OS 301. App OS 301 can send a message to the SMC 302 to store the collected panic log data (14: storePanicLog). In one embodiment, the SMC 302 can then write a set of log data that includes the panic log data from the App OS 301 to the DRAM 304 (15: CSOCPanicLogData). In one embodiment, the SMC 302 can optionally store the CSOC panic log data to memory within an always on processor (AOP RAM 305), which can be one of the processing components within the platform SOC that is maintained in an always-on state when the remainder of the PSOC is powered off. In one embodiment, the SMC 302 can optionally send a signal to the App OS 301 to confirm that the panic log data was stored (16: panicLogStored), although in other embodiments no completion signal is required. Once the App OS 301 can confirm the completion of local panic handler operations, the App OS 301 can send a message or signal to the SMC 302 to confirm that the App OS 301 panic operations have been performed (17: setAppOSDidPanic).

The bridge OS 303 expects an indication of panic completion from the App OS 301 or a timeout event will occur, as shown in operational flow 340 (e.g., operational flow 340A-340B). Operational flow 340A illustrates an indication of completion. Operational flow 340B indicates a timeout operation. If the SMC 302 receives an indication from the App OS 301, as shown in operational flow 340A, that panic operations have been performed (17: setAppOSDidPanic), the SMC 302 can indicate to the Bridge OS 303 that the App OS did indeed panic (18: AppOSDidPanic). If the Bridge OS 303 waits over a threshold period of time, a timeout event can occur (19: timeout) as shown in operational flow 340B. If the timeout event occurs, the Bridge OS 303 can proceed with system reset without waiting for the App OS 301.

Operational flow 350 illustrates system restart and log gathering. The Bridge OS 303 can initiate a reset of the platform SOC (20: SOCReset), which begins the reboot process for the platform. In one embodiment, the platform SoC reset can be performed without clearing or resetting the DRAM 304. As the DRAM 304 has not been reset, the PSoC panic log data (21: PSOCPanicLogData) and CSoC panic log data (22: CSoCPanicLogData) can be retrieved from the DRAM 304. Optionally, CSoC panic log data can be retrieved from the AOP RAM 305 if CSoC panic log was previously stored in that location. In one embodiment, different panic log data can be stored in different memories for resiliency purposes, should one of the memories be corrupted during reset. In one embodiment, copies of PSoC panic log data and CSoC panic log data can be stored in each of the DRAM 304 and the AOP RAM 305. Combined panic log data can then be written, by the Bridge OS 303 (23: CombinedPanicLogData), to non-volatile memory (NVM 306). The NVM 306, in various embodiments, can be various non-volatile storage locations within the computing device. In one embodiment, the NVM 306 represents NAND flash memory associated with the Bridge processor and Bridge OS 303. The Bridge OS 303 can then signal the SMC 302 to initiate system-wide power cycle operations (24: systemPowerCycle), which will reset all of the processing systems in the computing device and, in some embodiments, clear volatile memory within the system.

Once the system has performed a power cycle, the Bridge OS 303 can initiate a restart (25: bridgeOS restart), which can also restart the various platform processors upon which the Bridge OS 303 executes. The Bridge OS 303 can execute crash reporter operations 351, during which the combined panic log data is retrieved from the NVM 306 (26: CombinedPanicLogData). The crash reporter operations 351 can additionally include transmitting crash reporter data (27: CrashReporter Data) to the App OS 301. The crash reporter data can include the combined panic log data, along with additional system state data that can be used to interpret the panic log data. For example, call stack data can be acquired by panic handlers within App OS 301 and Bridge OS 303. The crash reporter data can be post processed after system restart to enhance the readability of the reported data. For example, the App OS 301 can add symbolic data to call stack information and/or perform other processing of the log data to enhance the readability of the data. In one embodiment, the App OS 301, can report the crash reporter data via a user interface, store the crash reporter data to a log repository, and/or transmit the panic log data, via a network, to a crash log repository associated with the client device.

Figure 4A:
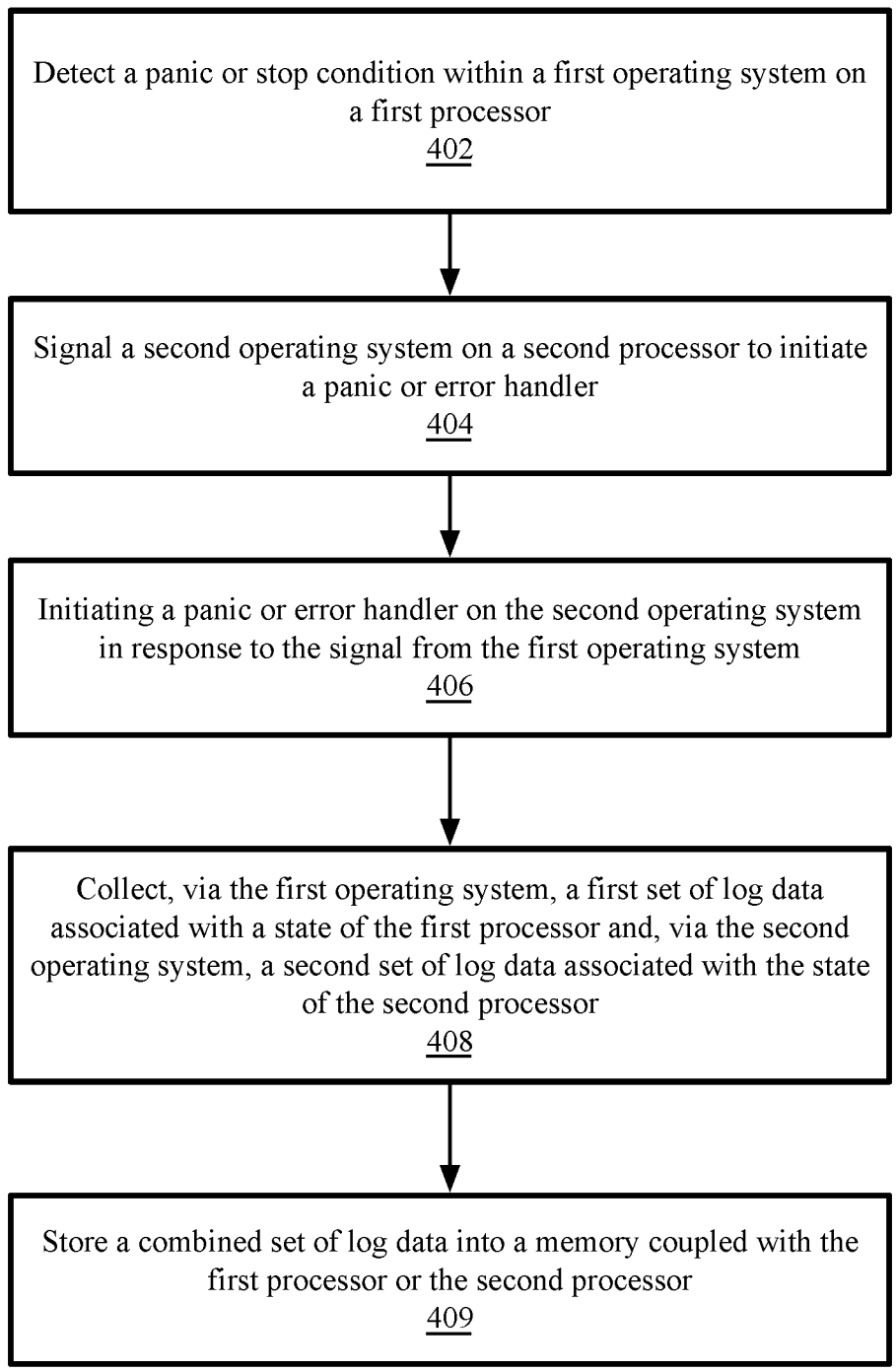
FIG. 4A-4B are a flow diagrams of logic to collect, store, and report panic log data during a coordinated panic flow across multiple processing and operating systems within a computing device, according to embodiments described herein.

FIG. 4A is a flow diagram of logic 400 to coordinate panic operational flows among distinct processing systems within a computing device, according to an embodiment. The logic 400 can coordinate panic operational flows between processing systems and operating system environments as described herein, including an application operating system environment 110 and bridge operating system environment 120 as in FIG. 1, which in one embodiment can execute on the compute SOC 210 and platform SOC 230 as in FIG. 2. The application operating system (see also, App OS 301 as in FIG. 3) can be any user-facing operating system configured for execution on a computing device having multiple distinct processing systems, such as, but not limited to the mac OS operating system provided by Apple Inc. of Cupertino, California. The Bridge OS (see also, Bridge OS 303 as in FIG. 3) can be any internal system or platform operating system that is configured to enable secure access to I/O and peripheral devices within a computing device. In one embodiment, panic flow communication between the processors can be facilitated by a system management controller, such as SMC 302 as in FIG. 3A-3B.

While two operating systems and processors may be described and illustrated herein, the logic and techniques of the various embodiments are not limited to two operating systems and processing environments, and panic operations can be coordinated between any number of processing systems and operating system environments within a single computing device. Additionally, any operating system environment can initiate a panic flow and the other operating system environments can initiate their respective panic handlers in response to a panic event received from other operating system environments.

A panic or stop condition can occur as a result of various errors or events that can place the first processor and/or first operating system in a state in which further operation cannot safely proceed due to a potential loss of data. For example, a panic can occur due to an attempt to execute an unsafe instruction or an attempt to access an invalid memory address. A panic can also occur due to a hardware fault by a processor or another hardware device that performs operations for the operating system. For example, processor can raise a machine check exception or a fatal error exception that indicates that the processor has detected an internal fault. Under such circumstances, the operating system may panic or halt, although the ability to capture log data on an operating system executing on such processor may be limited.

In one embodiment, the logic 400 can cause a first operating system on a first processor to detect a panic or stop condition, as shown at block 402. At block 404, the logic 400 can send a signal to a second operating system on a second processor to initiate a panic or error handler. In one embodiment, the logic 400 can cause the first operating system to signal the second operating system to enter a panic or error handler of the second operating system. As shown at block 406, the logic 400 can cause the second operating system to initiate a panic or error handler in response to the signal from the first operating system.

Within the respective error handlers of each operating system, a set of log data can be collected from each processor. For example, as shown at block 408, the logic 400 can collect, via the first operating system, a first set of log data associated with a state of the first processor. The logic 400 can also collect, via the second operating system, a second set of log data associated with the state of the second processor. Log data from other processors or operating systems executing on the computing device can also be collected. The collection can be performed by the panic or error handlers of the first operating system and the second operating system. As shown at block 409, the logic 400 can store a set of combined log data to a memory coupled with the first processor or the second processor. In one embodiment, the logic 400 can store the combined log data into non-volatile memory of the computing device for retrieval after system restart. If access to a non-volatile storage device is limited due to system error or because the system is in a degraded state, a process can be performed by logic 400 to temporarily store the log data in a volatile memory, as shown in FIG. 4B.

Figure 4B:
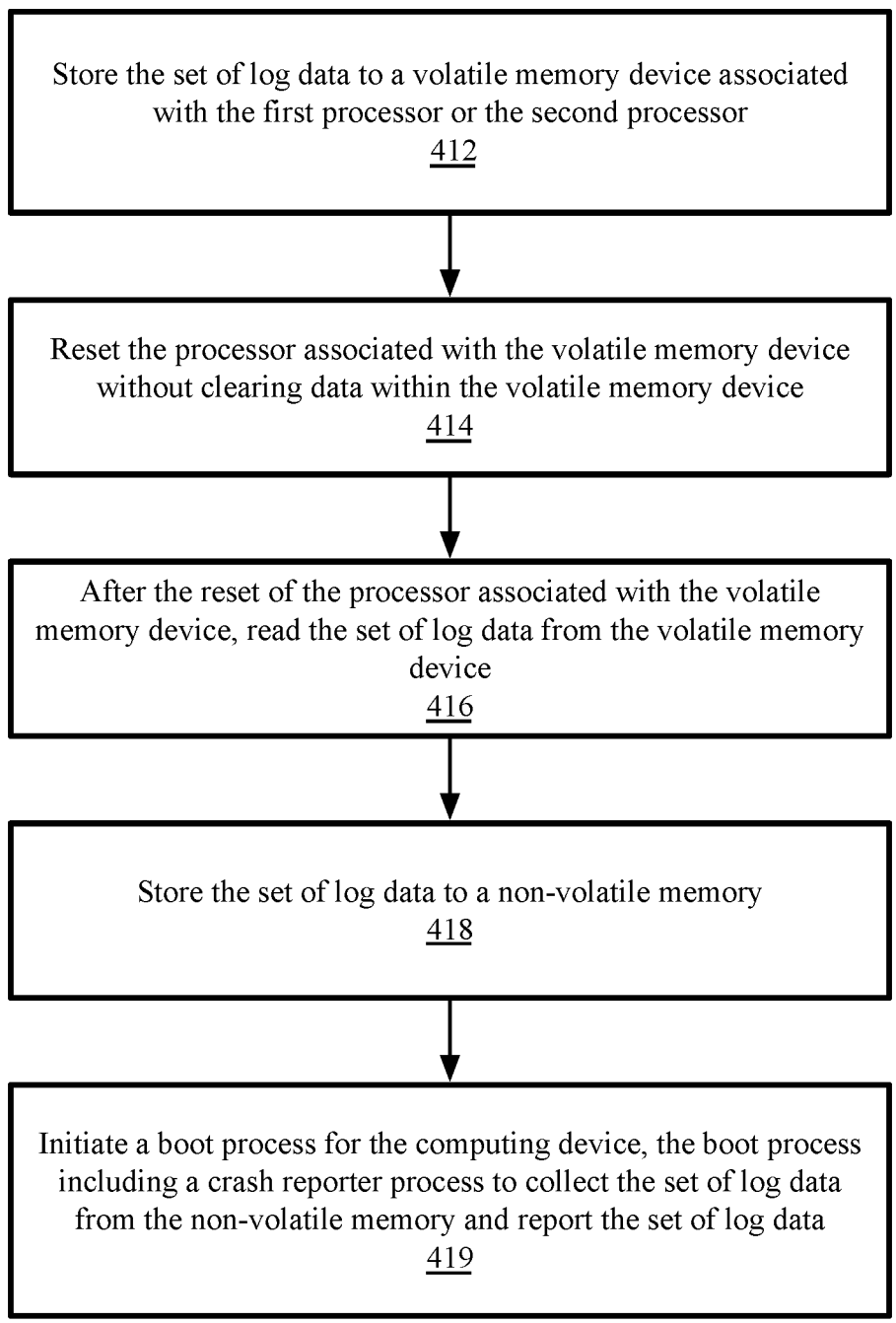

FIG. 4B is a flow diagram of logic 410 to store and report collected panic log data within a computing device, according to an embodiment described herein. The logic 410 can be a subroutine of logic 400, and can be executed when direct storage of log data to a non-volatile memory device cannot be performed during panic handling due to the inaccessibility of a desired storage device during the panic handling process.

In one embodiment, as shown at block 412, the logic 410 can cause the first processor or the second processor to store a set of log data to a volatile memory device associated with such processor, such as, but not limited to, DRAM 304 as in FIG. 3B. The set of log data can include separate log data from each of multiple operating system environments within the computing device, including a first set of log data associated with the CSOC and a second set of log data associated with the PSOC. As shown at block 414, the logic 410 can reset, or cause to be reset, the processor associated with the volatile memory device, without clearing data within the volatile memory device. After the reset of the processor associated with the volatile memory device, the logic 410, as shown at block 416, can cause that processor to read the set of log data from the volatile memory device. At block 418, the logic 410 can cause a processor to store the set of log data to a non-volatile memory. In one embodiment, the non-volatile memory can be a non-volatile memory of the processor associated with the volatile memory device in which the set of log data is retrieved at block 416. In one embodiment, other non-volatile memory devices can be used, such as a main non-volatile memory device of the computing device. At block 419, the logic 410 can cause the computing device, and the various processors of the computing device, to initiate their respective boot processes. A crash reporter process can execute on at least one of the processors of the computing device. The crash reporter process (e.g., crash reporter 351 as in FIG. 3B) can collect the set of log data from the non-volatile memory and report the set of log data, in one embodiment, to a crash reporting service. In one embodiment, the set of log data can be uploaded to a crash data repository associated with the computing device, either after completion of the boot process of the computing device or during the boot process of the computing device. In one embodiment, the set of log data can be reported to a user of the computing device via a user interface. The collected log data can be used to determine a potential cause of the panic, and can include the processor or operating system from which the panic originated.

Exemplary Computing Device Architecture

Figure 5:
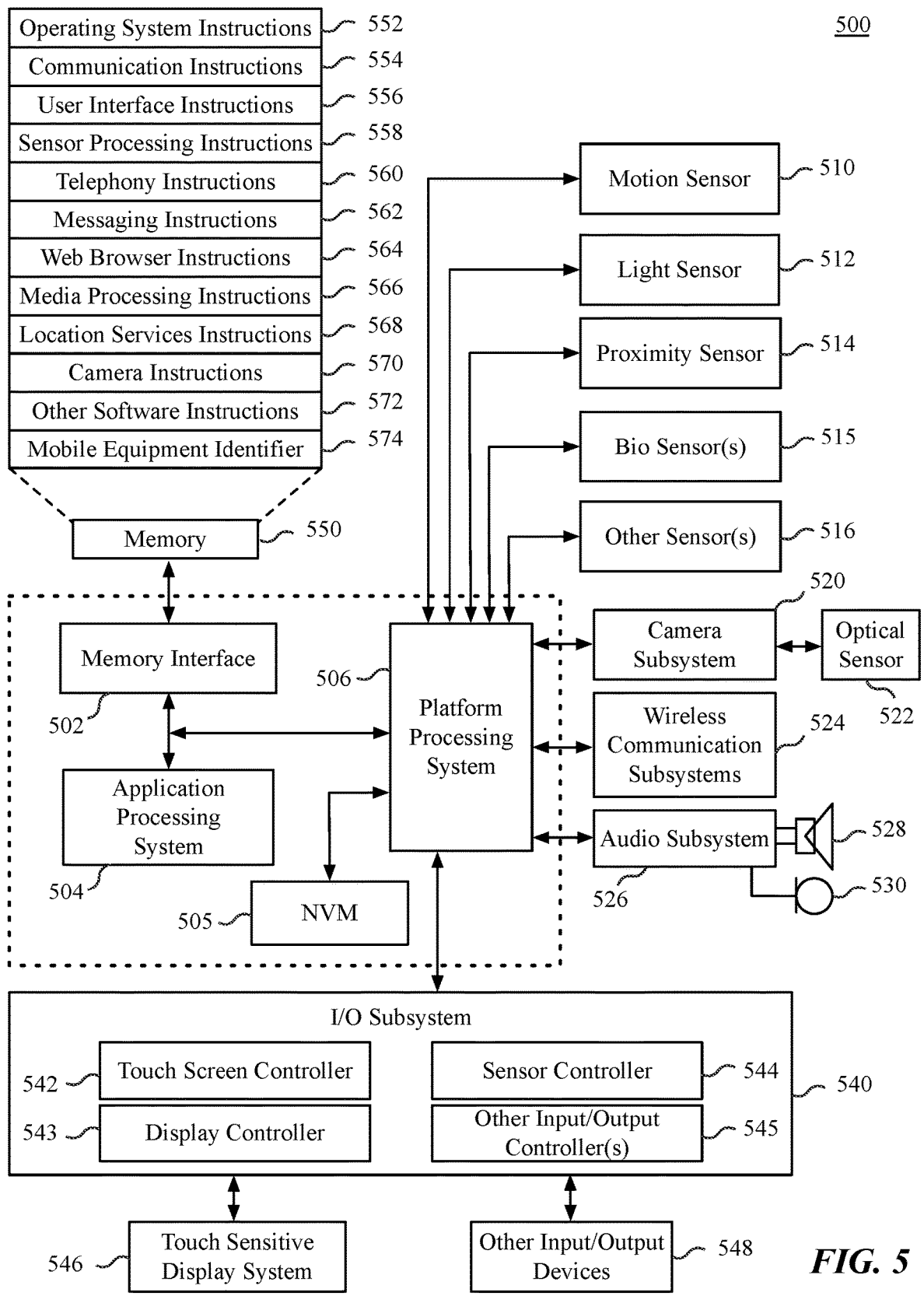
FIG. 5 is a block diagram of a computing device architecture, according to an embodiment.

FIG. 5 is a block diagram of a computing device architecture 500, according to an embodiment. The computing device architecture 500 includes a memory interface 502, a processing system 504, and a platform processing system 506. The platform processing system 506 can implement secure peripheral access and system authentication according to embodiments described herein. The various components can be coupled by one or more communication buses, fabrics, or signal lines. The various components can be separate logical components or devices or can be integrated in one or more integrated circuits, such as in a system on a chip integrated circuit. The processing system 504 may include multiple processors and/or co-processors. The various processors within the processing system 504 can be similar in architecture or the processing system 504 can be a heterogeneous processing system. In one embodiment, the processing system 504 is a heterogeneous processing system including one or more data processors, image processors and/or graphics processing units.

The memory interface 502 can be coupled to memory 550, which can include high-speed random-access memory such as static random-access memory (SRAM) or dynamic random-access memory (DRAM). The memory can store runtime information, data, and/or instructions are persistently stored in non-volatile memory 505, such as but not limited to flash memory (e.g., NAND flash, NOR flash, etc.). Additionally, at least a portion of the memory 550 is non-volatile memory. The platform processing system 506 can facilitate the communication between the processing system 504 and the non-volatile memory.

Sensors, devices, and subsystems can be coupled to the platform processing system 506 to facilitate multiple functionalities. For example, a motion sensor 510, a light sensor 512, and a proximity sensor 514 can be coupled to the platform processing system 506 to facilitate the mobile device functionality. Other sensors 516 can also be connected to the platform processing system 506, such as a positioning system (e.g., GPS receiver), a temperature sensor, a biometric sensor, or other sensing device, to facilitate related functionalities. A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

In one embodiment, the platform processing system 506 can enable a connection to communication peripherals including one or more wireless communication subsystems 524, which can include radio frequency receivers and transmitters and/or optical (e.g., infrared) receivers and transmitters. The specific design and implementation of the wireless communication subsystems 524 can depend on the communication network(s) over which a mobile device is intended to operate. For example, a mobile device including the illustrated computing device architecture 500 can include wireless communication subsystems 524 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 524 can provide a communications mechanism over which a client browser application can retrieve resources from a remote web server. The platform processing system 506 can also enable an interconnect to an audio subsystem 526, which can be coupled to a speaker 528 and a microphone 530 to facilitate voice-enabled functions, such as voice recognition, voice replication, digital recording, and telephony functions.

The platform processing system 506 can enable a connection to an I/O subsystem 540 that includes a touch screen controller 542 and/or other input controller(s) 545. The touch screen controller 542 can be coupled to a touch sensitive display system 546 (e.g., touch screen). The touch sensitive display system 546 and touch screen controller 542 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 546. Display output for the touch sensitive display system 546 can be generated by a display controller 543. In one embodiment, the display controller 543 can provide frame data to the touch sensitive display system 546 at a variable frame rate.

In one embodiment, a sensor controller 544 is included to monitor, control, and/or processes data received from one or more of the motion sensor 510, light sensor 512, proximity sensor 514, or other sensors 516. The sensor controller 544 can include logic to interpret sensor data to determine the occurrence of one of more motion events or activities by analysis of the sensor data from the sensors.

In one embodiment, the platform processing system 506 can also enable a connection to one or more bio sensor(s) 515. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 515 can include a finger print sensor that captures fingerprint data from the user. In another embodiment, bio sensor(s) 515 include a camera that captures facial information from a user's face. In some embodiments, the bio sensor(s) 515 can maintain previously captured biometric data of an authorized user and compare the captured biometric data against newly received biometric data to authenticate a user.

In one embodiment, the I/O subsystem 540 includes other input controller(s) 545 that can be coupled to other input/control devices 548, such as one or more buttons, rocker switches, thumb-wheel, infrared port, USB port, and/or a pointer device such as a stylus, or control devices such as an up/down button for volume control of the speaker 528 and/or the microphone 530.

In one embodiment, the memory 550 coupled to the memory interface 502 can store instructions for an operating system 552, including portable operating system interface (POSIX) compliant and non-compliant operating system or an embedded operating system. The operating system 552 may include instructions for handling basic system services and for performing hardware dependent tasks. In some implementations, the operating system 552 can be a kernel or micro-kernel based operating system.

The memory 550 can also store communication instructions 554 to facilitate communicating with one or more additional devices, one or more computers and/or one or more servers, for example, to retrieve web resources from remote web servers. The memory 550 can also include user interface instructions 556, including graphical user interface instructions to facilitate graphic user interface processing.

Additionally, the memory 550 can store sensor processing instructions 558 to facilitate sensor-related processing and functions; telephony instructions 560 to facilitate telephone-related processes and functions; messaging instructions 562 to facilitate electronic-messaging related processes and functions; web browser instructions 564 to facilitate web browsing-related processes and functions; media processing instructions 566 to facilitate media processing-related processes and functions; location services instructions including GPS and/or navigation instructions 568 and Wi-Fi based location instructions to facilitate location based functionality; camera instructions 570 to facilitate camera-related processes and functions; and/or other software instructions 572 to facilitate other processes and functions, e.g., security processes and functions, and processes and functions related to the systems. The memory 550 may also store other software instructions such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. A mobile equipment identifier, such as an International Mobile Equipment Identity (IMEI) 574 or a similar hardware identifier can also be stored in memory 550.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions may be implemented in hardware and/or in software, including in one or more signal processing and/or application specific integrated circuits.

Figure 6:
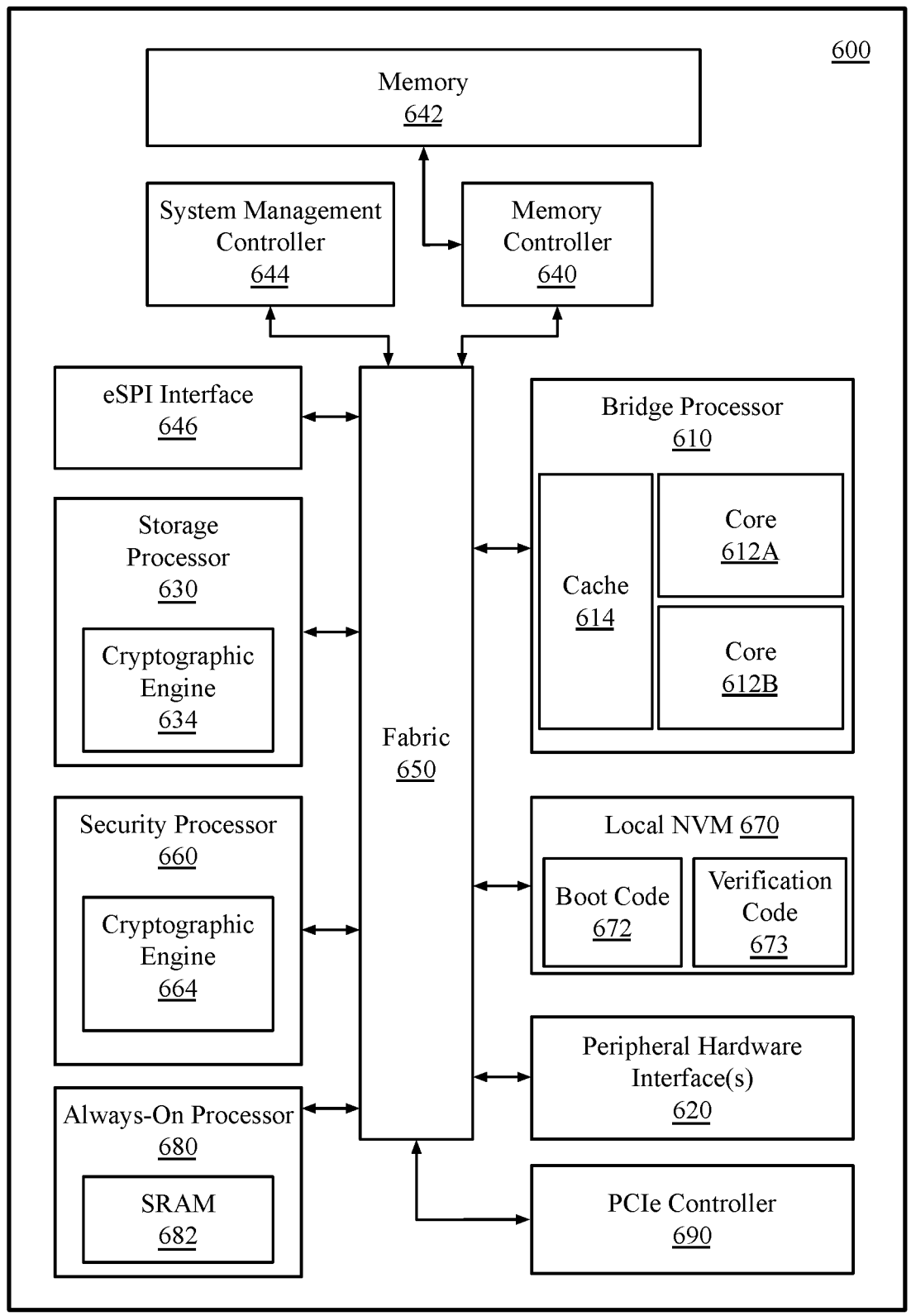
FIG. 6 is a block diagram of a platform processing system, according to an embodiment.

FIG. 6 is a block diagram of a platform processing system 600, according to an embodiment. In one embodiment, the platform processing system 600 is a system on a chip integrated circuit that can be a variant of the platform processing system 506 of FIG. 5. The platform processing system, in one embodiment, includes a bridge processor 610 that facilitates an interface to the various system peripherals via one or more peripheral hardware interface(s) 620. In one embodiment, the platform processing system 600 includes a crossbar fabric that enables communication within the system, although a system bus may also be used in other embodiments. The platform processing system 600 can also include a system management controller 644 and always-on processor 680, which can be variants of the SMC 236 and AOP 233 as in FIG. 2. The platform processing system 600 can also include an eSPI interface 646, which can be an eSPI slave in communication with an eSPI master in the compute SOC 210 of FIG. 2. The eSPI interface 646 can be used to enable the system management controller 644 to communicate with the compute SOC and other components external to the platform processing system 600. Additionally, the platform processing system 600 can also include a PCIe controller 690 to enable components of the platform processing system 600 to communicate with components of the computing device that are coupled to a PCIe bus within the system.

In one embodiment, the bridge processor 610 includes multiple cores 612A-612B and at least one cache 614. The bridge processor 610 can facilitate secure access to various peripherals described herein, including enabling secure access to camera, keyboard, or microphone peripherals to prevent an attacker from gaining malicious access to those peripherals. The bridge processor 610 can then securely boot a separate and complete operating system (e.g., Bridge OS 303 as in FIG. 3) that is distinct from the user facing operating system that executes application code for the computing device (e.g., App OS 301 as in FIG. 1). The bridge processor 610 can facilitate the execution of peripheral control firmware that can be loaded from local non-volatile memory 670 connected with the processor via the fabric 650. The peripheral firmware can be securely loaded into the memory 642 via a fabric-attached memory controller 640, enabling the bridge processor 610 to perform peripheral node functionality for the peripherals attached via the peripheral hardware interface(s) 620. In one embodiment, the peripheral firmware can also be included within or associated with secure boot code 672. The secure boot code 672 can be accompanied by verification code 673 that can be used verify that the boot code 672 has not been modified.

The platform processing system 600 also includes a security processor 660, which is a secure circuit configured to maintain user keys for encrypting and decrypting data keys associated with a user. As used herein, the term "secure circuit" refers to a circuit that protects an isolated, internal resource from being directly accessed by any external circuits. The security processor 660 can be used to secure communication with the peripherals connected via the peripheral hardware interface(s) 620. The security processor 660 can include a cryptographic engine 664 that includes circuitry to perform cryptographic operations for the security processor 660. The cryptographic operations can include the encryption and decryption of data keys that are used to perform storage volume encryption or other data encryption operations within a system.

The platform processing system 600 can also include a storage processor 630 that controls access to data storage within a system, such as, for example, the non-volatile memory 505 of FIG. 5. The storage processor 630 can also include a cryptographic engine 634 to enable compressed data storage within the non-volatile memory. The cryptographic engine 634 can work in concert with the cryptographic engine 664 within the security processor 660 to enable high-speed and secure encryption and decryption of data stored in non-volatile memory. The cryptographic engine 634 in the storage processor 630 and the cryptographic engine 664 in the security processor may each implement any suitable encryption algorithm such as the Data Encryption Standard (DES), Advanced Encryption Standard (AES), Divest Shamir Adleman (RSA), or Elliptic Curve Cryptography (ECC) based encryption algorithms.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 7:
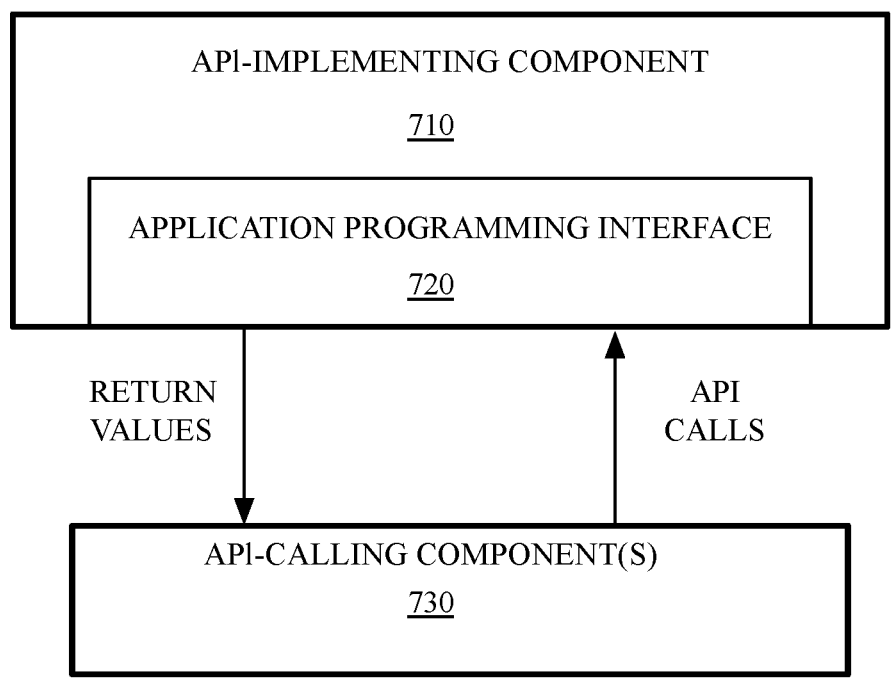
FIG. 7 is a block diagram illustrating an exemplary API architecture, which can be used in some embodiments.

FIG. 7 is a block diagram illustrating an exemplary API architecture, which can be used in some embodiments. As shown in FIG. 7, the API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates one instance of the API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

Embodiments described herein provide hardware and software logic to enable diverse computing environments of a hybrid compute system to function as a single computing device. In particular, embodiments enable a coordinated panic flow in which multiple processing environments of a hybrid compute system coordinate system panic and error reporting. Should one of the essential computing systems within the computing device exhibit a fatal error, each of the systems can perform an error recovery process and report error status, allowing the system to cohesively recover from the error and report a unified error status upon recovery.

One embodiment provides for a data processing system comprising multiple independent processors to execute multiple operating system environments of the data processing system, the multiple operating system environments to enable operation of multiple regions of a computing device associated with the data processing system. The multiple operating system environments are interconnected via a transport agnostic communication link. In response to detection of a fatal error in one or more of the multiple operating system environments, the multiple operating system environments coordinate performance of multiple separate error handling operations within the multiple operating system environments to generate a combined error log. The combined error log includes operational states of the multiple operating system environments. The multiple independent processors can then be reset without clearing the combined error log from memory.

In one embodiment, the multiple independent processors include a first processor including a first set of one or more processor cores to execute a first set of instructions and a second processor that is separate from the first processor, where the second processor includes a second set of one or more processor cores to execute a second set of instructions to enable the first set of instructions to access to a set of input/output devices within the computing device. In response to an error associated with the first processor or the second processor, the first processor and the second processor are to independently execute separate instructions to gather and store respective operational states associated with each processor.

One embodiment provides an electronic device comprising a first processor to execute a first operating system. The first processor includes one or more application processor cores. The electronic device also can include a second processor to execute a second operating system. The second processor includes one or more processor cores to manage a set of input/output devices within the computing device. In one embodiment, in response to detection of an error state within the first operating system, the first operating system can enter an error handler of the first operating system and cause the second operating system to enter the error handler of the second operating system. The error handlers of the first operating system and the second operating system can collect data associated with a state of the operating systems and associated processors of the computing device. At least one of the first operating system or the second operating system can write the data associated with the state of the operating systems and associated processors to a memory device. The first processor and the second processor can then be reset.

One embodiment provides for an error handling method for an electronic device, the method comprising detecting a panic or stop condition within a first operating system on a first processor of the electronic device and signaling a second operating system on a second processor to initiate an error handler. The second processor is separate from the first processor. The method additionally includes initiating an error handler on the second operating system in response to the signal from the first operating system, collecting, via an error handler on the first operating system, data associated with a state of the first processor, collecting, via an error handler on the second operating system, data associated with the state of the second processor, and storing a combined set of data to a memory device coupled with the first processor or the second processor.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device comprising:
   a first processor to execute a first operating system, the first processor including one or more application processor cores and the first operating system including a first error handler;
   a second processor to execute a second operating system, the second processor including one or more processor cores to manage a set of input/output devices within the electronic device, the second operating system including a second error handler, wherein in response to detection of an error state within the first operating system, the first operating system is to enter the first error handler and cause the second operating system to enter the second error handler; and
   a management controller to facilitate communication between the first error handler and the second error handler, wherein the first error handler is to collect data associated with a state of the first operating system and a state of the first processor and the second error handler is to collect data associated with a state of the second operating system and a state of the second processors, the first operating system or the second operating system is to write the data associated with the state of operating systems and associated processors to a memory device, and the management controller is to reset the first processor and the second processor after the write of the data associated with the state of operating systems and associated processors.

2. The electronic device as in claim 1, wherein the first error handler is to cause the second operating system to enter the second error handler.

3. The electronic device as in claim 1, wherein the management controller is a microcontroller or microprocessor.

4. The electronic device as in claim 1, wherein the first operating system or the second operating system is to write the data associated with a state of operating systems and associated processors to a volatile memory device.

5. The electronic device as in claim 4, wherein the management controller is to reset the first processor and the second processor without clearing data within the volatile memory device and store the data associated with the state of operating systems and associated processors to a non-volatile memory device of a processor associated with the volatile memory device.

6. The electronic device as in claim 1, the first processor having a first instruction set architecture and the second processor having a second instruction set architecture different from the first instruction set architecture.

7. The electronic device as in claim 6, wherein the error state within the first operating system indicates a potential for data corruption during continued operation of the first operating system.

8. The electronic device as in claim 7, wherein the error state includes a kernel panic within the first operating system.

9. An error handling method for an electronic device, the method comprising:
   detecting a panic or stop condition within a first operating system on a first processor of the electronic device;
   signaling a second operating system on a second processor to initiate an error handler, the second processor separate from the first processor;
   initiating the error handler on the second operating system in response to the signal from the first operating system;
   collecting, via an error handler on the first operating system, data associated with a state of the first processor;
   collecting, via the error handler on the second operating system, data associated with the state of the second processor;
   storing a combined set of data to a memory device coupled with the first processor or the second processor; and resetting the first processor and the second processor after storing the combined set of data to the memory device.

10. The method as in claim 9, additionally comprising: initiating an error handler on the first operating system in response to detecting the panic or stop condition within the first operating system; and signaling the second operating system via the error handler on the first operating system.

11. The method as in claim 9, wherein storing the combined set of data to a memory device coupled with the first processor or the second processor includes:
storing a first set of log data from the first operating system to a volatile memory device; and
storing a second set of log data from the second operating system to the volatile memory device; and
resetting a processor associated with the volatile memory device without clearing data within the volatile memory device, wherein the processor associated with the memory device is one of the first processor or the second processor.

12. The method as in claim 11, additionally comprising:
after resetting the processor associated with the volatile memory device, reading, from the volatile memory device, the first set of log data and the second set of log data;
combining the first set of log data from the first operating system with the second set of log data from the second operating system; and
storing combined log data to a non-volatile memory device of the processor associated with the volatile memory device.

13. The method as in claim 12, additionally including: initiating a boot process for the electronic device, the boot process including a crash reporter process to collect the combined log data from the non-volatile memory device; and reporting the combined log data to a crash reporting service.

14. A data processing system comprising:
a first processor to execute a first operating system, the first processor including one or more application processor cores; and
a second processor to execute a second operating system, the second processor including one or more processor cores to manage a set of input/output devices within the electronic device;
wherein in response to detection of an error state within the first operating system, the first operating system is to enter an error handler of the first operating system and cause the second operating system to enter an error handler of the second operating system;
wherein the error handlers of the first operating system and the second operating system are to collect data associated with a state of operating systems and a state of associated processors of the electronic device;
wherein at least one of the first operating system or the second operating system are to write the data associated with a state of operating systems and associated processors to a memory device; and wherein the first processor and the second processor are to reset without clearing the data associated with the state of the operating systems and associated processors from the memory device.

15. The data processing system as in claim 14, the first processor having a first instruction set architecture and the second processor having a second instruction set architecture different from the first instruction set architecture.

16. The data processing system as in claim 15, wherein the error handler of the first operating system is to cause the second operating system to enter the error handler of the second operating system.

17. The data processing system as in claim 16, wherein the error state within the first operating system indicates a potential for data corruption during continued operation of the first operating system.

18. The data processing system as in claim 17, wherein the error state includes a kernel panic within the first operating system.

19. The data processing system as in claim 18, additionally comprising a microcontroller or microprocessor to facilitate communication between the error handler of the first operating system and the error handler of the second operating system.

20. The data processing system of claim 14, wherein the error handler of the first operating system collects data associated with a first state of the first processor but not the second processor, and the error handler of the second operating system collects data associated with a second state of the second processor but not the first processor.

* * * * *